US007511600B2

(12) United States Patent
Von Behr et al.

(10) Patent No.: US 7,511,600 B2
(45) Date of Patent: Mar. 31, 2009

(54) PYROMECHANICAL SEPARATING DEVICE WITH A SPECIALLY SHAPED CURRENT CONDUCTOR RAIL

(75) Inventors: Diedrich Von Behr, Erlangen (DE); Uwe Brede, Fuerth (DE); Gerhard Kordel, Nuernberg-Kornburg (DE); Juergen Neuser, Massenbachhausen (DE); Wolfgang Seitz, Leingarten (DE); Paulus Bayer, Nassenfeld/Zell (DE); Georg Seitz, Kasing (DE)

(73) Assignee: Delphi Technologies, Inc., Troy, MI (US)

( * ) Notice: Subject to any disclaimer, the term of this patent is extended or adjusted under 35 U.S.C. 154(b) by 235 days.

(21) Appl. No.: 10/546,568

(22) PCT Filed: Feb. 25, 2004

(86) PCT No.: PCT/EP2004/001835

§ 371 (c)(1),
(2), (4) Date: Feb. 9, 2006

(87) PCT Pub. No.: WO2004/077478

PCT Pub. Date: Sep. 10, 2004

(65) Prior Publication Data

US 2006/0145808 A1 Jul. 6, 2006

(30) Foreign Application Priority Data

Feb. 26, 2003 (DE) ................................ 103 08 185

(51) Int. Cl.
*H01H 71/20* (2006.01)
*H01H 37/76* (2006.01)
*B60K 28/10* (2006.01)

(52) U.S. Cl. ......................... 337/157; 337/30; 337/251; 337/401; 337/405; 200/61.08

(58) Field of Classification Search ................... 337/30, 337/157, 251, 401, 405, 165; 200/61.08
See application file for complete search history.

(56) References Cited

U.S. PATENT DOCUMENTS 3,873,786 A * 3/1975 Lagofun .................. 200/61.08
3,932,717 A * 1/1976 Dike et al. ............... 200/61.08
4,224,487 A 9/1980 Simonsen
4,417,519 A * 11/1983 Lutz ........................... 102/263
5,535,842 A * 7/1996 Richter et al. ............... 180/279
5,783,987 A * 7/1998 Kern et al. .................. 337/401
5,877,563 A * 3/1999 Krappel et al. ............. 307/10.1

(Continued)

FOREIGN PATENT DOCUMENTS

DE 297 00 594 U 3/1997

(Continued)

*Primary Examiner*—Anatoly Vortman
(74) *Attorney, Agent, or Firm*—Douglas D. Feke

(57) ABSTRACT

A pyromechanical disconnecting device having an improved electric current conductor rail. The electric current conductor rail includes a center section perpendicular to the path of a disconnecting tool, and a first and second side section extending perpendicular from the center section. The electric current conductor rail further includes a first and second end piece connected respectively to the first and second side sections apart from the center section. Each of the end pieces is connected along a fold perpendicular to the center section and includes a bore for receiving a fastener to attach the electric current conductor rail to a housing.

6 Claims, 2 Drawing Sheets

U.S. PATENT DOCUMENTS

| | | | | |
|---|---|---|---|---|
| 5,990,572 | A * | 11/1999 | Yasukuni et al. | 307/10.1 |
| 6,194,988 | B1 * | 2/2001 | Yamaguchi et al. | 337/157 |
| 6,222,439 | B1 * | 4/2001 | Tanigawa et al. | 337/401 |
| 6,232,568 | B1 * | 5/2001 | Hasegawa et al. | 200/61.08 |
| 6,281,781 | B1 * | 8/2001 | Yamaguchi | 337/401 |
| 6,295,930 | B1 * | 10/2001 | Kume et al. | 102/202.5 |
| 6,411,190 | B1 * | 6/2002 | Yamaguchi et al. | 337/401 |
| 7,123,124 | B2 * | 10/2006 | Caruso et al. | 337/157 |
| 2004/0041682 | A1 * | 3/2004 | Pasha et al. | 337/401 |
| 2004/0221638 | A1 * | 11/2004 | Brede et al. | 72/326 |

FOREIGN PATENT DOCUMENTS

| | | | |
|---|---|---|---|
| DE | 197 32 650 | A | 2/1999 |
| DE | 198 17 133 | A | 10/1999 |
| EP | 0 936 647 | A | 8/1999 |

* cited by examiner

PYROMECHANICAL SEPARATING DEVICE WITH A SPECIALLY SHAPED CURRENT CONDUCTOR RAIL

TECHNICAL FIELD OF INVENTION

The invention relates to a pyromechanical disconnecting device with a housing in which an electrically conducting current conductor rail is arranged, constructed as able to be cut through by a disconnecting tool driven by a pyrotechnical propellant charge at a disconnecting point, and the current conductor rail has on its end pieces in each case a fastening facility for connecting electrical conductors.

BACKGROUND OF THE INVENTION

A pyromechanical disconnecting device of this kind is described in DE 197 12 387 A1 and shows an electrically conducting current conductor rail arranged in a straight line in a housing.

A disadvantage of this way of carrying conductors is that, because the conductors are carried in a straight line through the necessary screw connection, e.g. to a car battery, the vibrations, jolts, changes in temperature, etc., occurring during operation of the vehicle, result in undesired deformations and twisting of the current conductor rail, which in the extreme case causes the current conductor rail to break, whereby the current supply in the vehicle would be undesiredly interrupted.

It is desirable to have a pyromechanical disconnecting device that can withstand heavy stresses without the current conductor rail breaking.

SUMMARY OF THE INVENTION

According to the invention this object is achieved in that the two end pieces of the current conductor rail are arranged at right angles to the plane of the disconnecting point and the disconnecting point is formed by a tapering of the conductor cross-section.

In advantagous configuration of the invention the tapering of the conductor cross-section goes through the entire width of the current conductor rail.

The arrangement of the end pieces constructed at right angles to the plane of the disconnecting point is preferably achieved by double right-angled bending of the current conductor rail in each case. This bending is done at two different points of the current conductor rail.

The disconnecting point preferably forms a quadrangle on the current conductor rail with two transitions to the remaining current conductor rail, arranged crosswise to the longitudinal direction of the current conductor rail, wherein the transitions in one embodiment run diagonally ending in the remaining current conductor rail.

Alternatively, one transition has a one-sided notch in the tapering and the other transition is constructed as a bending point. In this way the disconnecting tool can cut through the disconnecting point at the notch and then bend the tapering at the bending point.

This is made easier if the bending point preferably has an inward notch on the side of the transition facing away from the disconnecting tool.

This pyromechanical disconnecting device is preferably used for electrical uncoupling of a car battery in the event of an accident.

DETAILED DESCRIPTION OF INVENTION

Figure 1:
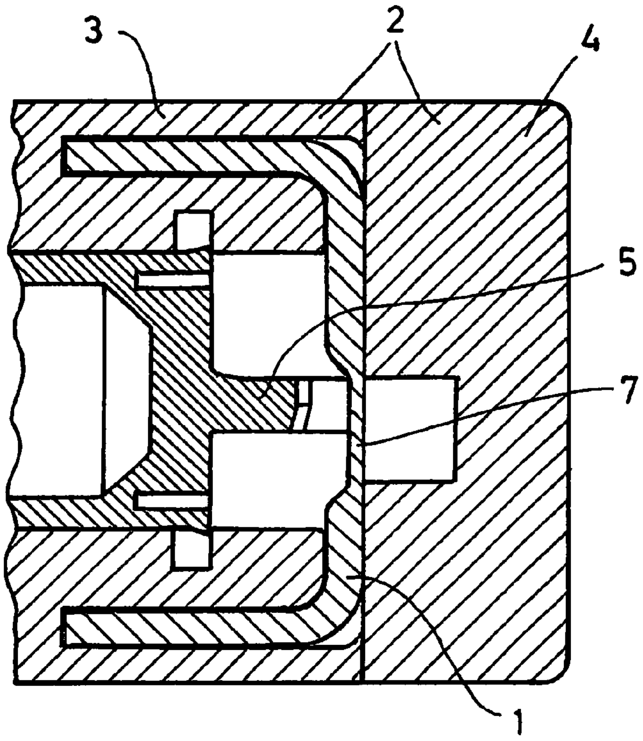
FIG. 1 shows a top view of the current conductor having a disconnecting point located in a housing.

FIG. 1 illustrates a current conductor rail 1 located in a housing 2 consisting of a housing lower part 3 and a housing upper part 4. Further indicated in FIG. 1 is a disconnecting tool 5 which is accelerated by suitable measures and disconnects the current conductor rail 1 owing to its kinetic energy.

Figure 2:
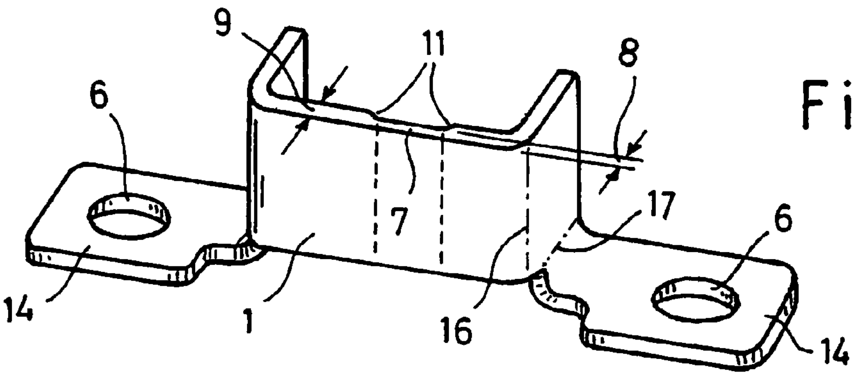
FIG. 2 shows a perspective view of the current conductor having side sections extending perpendicular to the center section and end pieces folded perpendicular to the center section.

FIG. 2 shows the current conductor rail 1 as a whole. The disconnecting point 7 forms a quadrangle on the current conductor rail 1 with two transitions 11 to the remaining current conductor rail 9, arranged cross-wise to the longitudinal direction of the current conductor rail 1. On the end pieces 11 (sic) a fastening facility 6, here fastening holes, is arranged in each case. These two end pieces 14 are arranged at right angles to the plane of the disconnecting point 7. This rectangular arrangement to the plane of the disconnecting point 7 is achieved by double rectangular bending of the current conductor rail 1 at two different points 16, 17 in each case. This advantageously reduces the forces on the disconnecting point 7 and thereby appreciably decreases the mechanical stress on the component.

Figure 3:
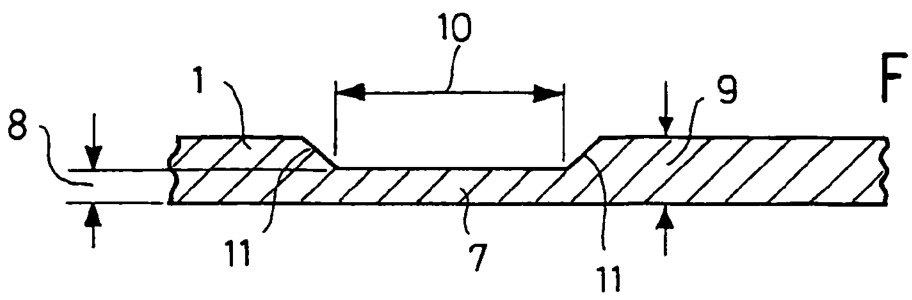
FIG. 3 shows a cross section of the current conductor rail.

FIG. 3 shows a section through a current conductor rail 1 in the area of the disconnecting point 7. At the disconnecting point 7 the conductor cross-section 8 is tapered in respect of the remaining current conductor rail 9. The length of the tapering is designated by the reference numerical 10. At the edge of the disconnecting point 7 this passes over into the remaining current conductor rail 9 in each case via a transition 11. In the embodiment in FIG. 3 these transitions pass over into the remaining current conductor rail 7 (sic) running diagonally.

Figure 4:
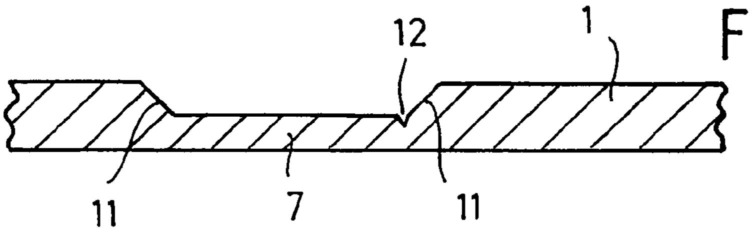
FIG. 4 shows an additional notch in the current conductor rail.

FIG. 4 shows an additional notch 12 which appreciably simplifies the disconnecting process.

Figure 5:
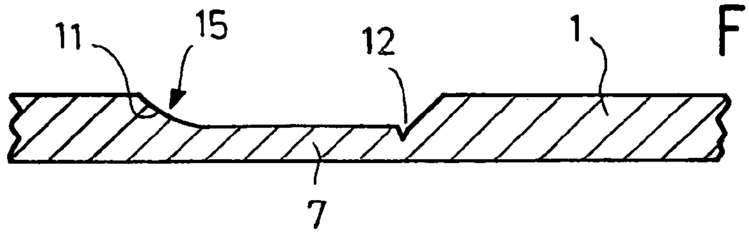
FIG. 5 shows a bent transition in the current conductor rail.

FIG. 5 shows the notch 12 and additionally on the opposite transition a bent transition 11, whereby a bending point 15 is created.

Figure 6:
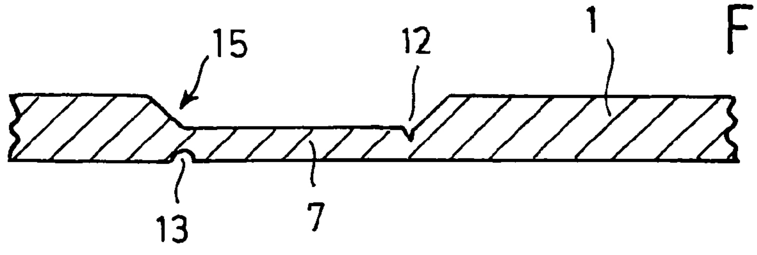
FIG. 6 shows an inward notch in the current conductor rail.

In FIG. 6 an inward notch 13 is arranged at the bending point 15 on the side of the transition 11 facing away from the disconnecting tool 5. This inward notch 13 appreciably simplifies the bending process.

This disconnecting device is preferably used for the electrical uncoupling of a car battery in the event of an accident.

The invention claimed is:

1. A pyromechanical disconnecting device comprising a housing;

an electric current conductor rail disposed in said housing and having a disconnecting point;

a disconnecting tool movable along a path toward the disconnecting point and adapted to server the electric current conductor rail; and a pyrotechnical charge adapted to drive said disconnecting tool along said path;

wherein said electric current conductor rail comprises a center section perpendicular to the path of the disconnecting tool and having a tapering at said disconnecting point;

a first and second side sections connected to the center section, wherein each side section extends perpendicular to center section, and a first and second end pieces connected respectively to the first and second side sections apart from the center section, each said end piece being connected along a fold perpendicular to the center section and including a bore for receiving a fastener to attach the electric current conductor rail to the housing.

2. A pyromechanical disconnecting device in accordance with claim 1, wherein the center section, the side sections and the end pieces are integrally formed by bending the side sections perpendicular to the center section, and bending each end piece perpendicular to the respective side section.

3. A pyromechanical disconnecting device in accordance with claim 1, wherein the side sections are spaced apart along a longitudinal direction of the center section, and wherein the center section includes a width perpendicular to the longitudinal direction, and wherein the center section is tapered along the width to form the disconnecting point.

4. A pyromechanical disconnecting device in accordance with claim 3, wherein the disconnecting point includes transitions that extend diagonally relative to the longitudinal direction.

5. A pyromechanical disconnecting device in accordance with claim 4, wherein one transition of the disconnecting point includes a one-sided notch and another transition is a bending point.

6. A pyromechanical disconnecting device in accordance with claim 5, wherein the bending point includes a notch in a surface of the center section facing away from the disconnecting tool.

* * * * *